Patented May 19, 1931

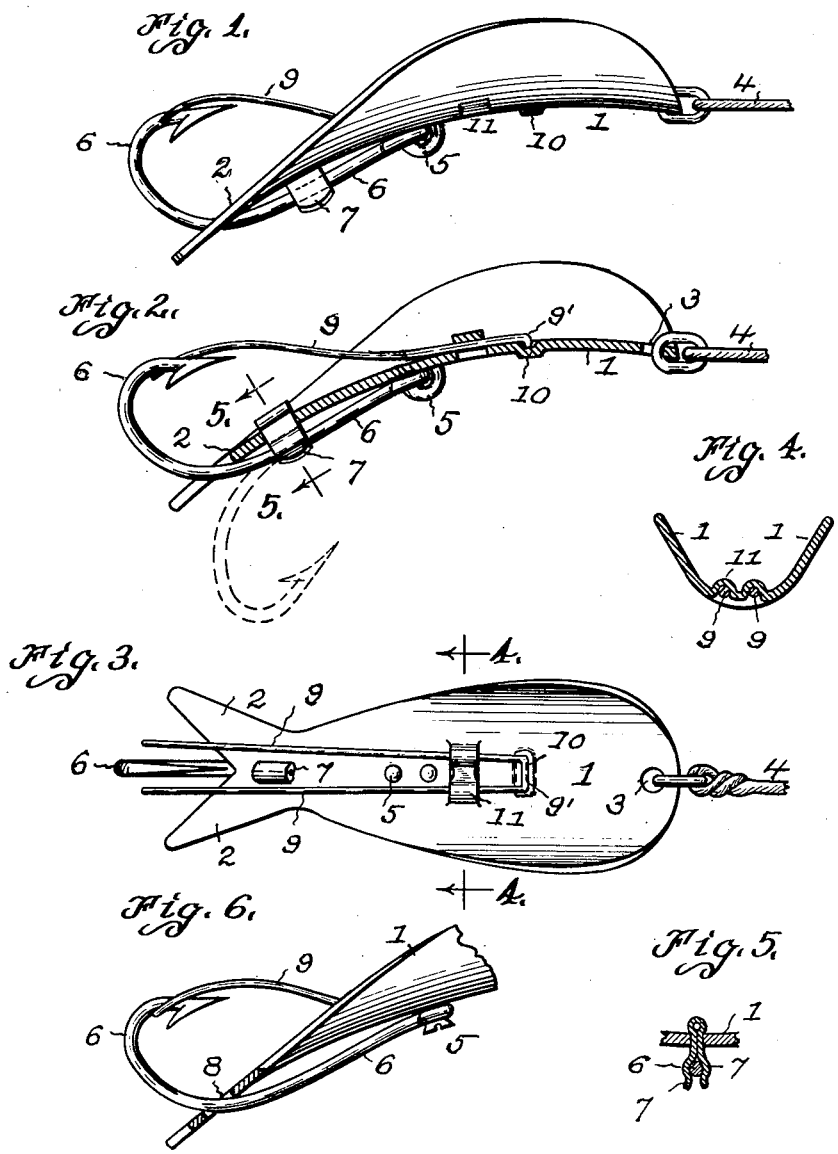

1,806,088

UNITED STATES PATENT OFFICE

AUGUST F. SCHNELL, OF KANKAKEE, ILLINOIS

FISH LURE

Application filed April 12, 1930. Serial No. 443,663.

This invention relates to that class of artificial fish bait or lures of what is generally known as the spoon type, and this improvement has for its object:

To provide a structural formation and combination of parts by means of which the body of the lure of a rigid plate material having a combined transverse and longitudinal formation which in connection with a flattened tail formation is adapted in actual trolling use to impart said lure body a combined side wise and up and down movement in a passage through the water and attain a desired degree of visibility to the fish to be lured, all as will hereinafter more fully appear.

In the accompanying drawings:

Fig. 1 is a side elevation of a fish lure embodying the preferred form of the invention.

Fig. 2 is a central longitudinal section of same.

Fig. 3 is a top view of the same.

Fig. 4 is a detail transverse section on line 4.—4. Fig. 3.

Fig. 5 is a similar section on line 5.—5. Fig. 2.

Fig. 6 is a detail sectional elevation of a modified arrangement of parts of the rear portion of the lure.

Like reference numerals indicate like parts in the several views.

The body portion 1 of the lure or bait is formed of a plate metal or like rigid material and is of an oblong tapering formation with its widest portion near its forward end. Said body has a curved forward end while the rear portion 2 thereof is of the conventional forked or fish tail shape, and in this improvement is of a substantially flat form as shown.

In the present construction the lure body 1 from end to end, is curved longitudinally with the tail portion 2 forming an approximately flat and straight extension thereof. In connection with the longitudinally curved formation just described, the lure body from its forward end to the tail extension 2 has a concavo-convex form in a transverse direction, with its greatest extent in the forward part of the lure body and gradually decreasing in extent to its junction with the tail extension 2, and in this connection a material part of the invention consists in a reverse arrangement of the longitudinal curve of the lure body with relation to the transverse curved formation of said body.

With the described formation of the lure body, it has been found by actual use, that in the passage of the same through the water in a trolling operation, the described longitudinal and transverse formations, in reversed relation, and in connection with the flat tail extension 2, will cause a combined side-wise sway and up and down movements to the lure body during its travel and thus impart added visibility to the lure to attract to a game fish in its neighborhood.

Near its front end, the lure body 1 is provided with a centrally disposed orifice or eye 3 for the attachment of the fish line 4 by means of which the fisherman guides and manipulates the lure.

On its underside and midway its length, the lure body 1 is formed with a screw threaded orifice for the reception of an attaching eye or screw 5 by which the eye of a fish hook 6 has fixed attachment, and adjacent to the free end of the aforesaid tail portion 2 is provided with means for holding the shank portion of the fish hook 6 against lateral displacement.

The holding means above referred to preferably comprises a resilient holding clip 7 on the underside of the lure body 1 with its holding jaws adapted to clasp and hold the shank of the fish hook 6 in proper relation to the other parts of the lure. This construction is preferred for the reason that while a rigidly held hook is best adapted for hooking the fish, in some cases where a side strain or leverage is imposed on the hook there is a tendency to a breakage of the shank of the hook, or a tearing of the hook out of the mouth of the fish. The general scope of this invention embraces a rigid attachment of the shank of the hook to the lure body by the passage of said shank through the usual orifice 8 in the tail portion 2 of the lure body, as illustrated in Fig. 6.

The usual resilient wire weed guards 9 that are associated with the barbed end of the fish hook 6, are in the present improvement rigidly attached to the upper surface of the lure body 1 by a construction as follows:

The pair of wire guards or fingers 9 are connected together at their forward ends by a return bend, with such portion having a downturned formation 9' adapted to enter a socket recess 10 in the lure body and be held at such point from movement.

At a point removed from such end attachment of the guard wires 9, a secondary attachment of said wires is attained by a metal strip 11 formed by transversely slitting the lure body 1 at such point. Said strip 11 has an initially raised position to admit of the introduction of the guard wires 9 underneath the same, after which the central part of the strip is depressed to firmly clasp and hold the guard wires 9 in place, as illustrated in Figs. 3 and 4.

While a single barbed fish hook 6 will ordinarily be employed, a double barbed hook or two or more hooks may be attached to the lure body without departing from the scope of this invention.

Having thus fully described the invention, what I claim as new, is:—

1. A fish lure, comprising a lure body of rigid plate material having its greatest lateral enlargement near its rounded front end and tapering to its rear end at which point it is formed with a forked tail extension, said body being curved longitudinally in one direction and transversely in the other direction, with both curvatures ending at the junction with said tail extension, a fish hook secured at one end to said lure body, and means on said tail extension for holding the fish hook against lateral displacement.

2. A fish lure, comprising a lure body of rigid plate material having its greatest lateral enlargement near its rounded front end and tapering to its rear end at which point it is formed with a tail extension of a flat form, said body being curved longitudinally in one direction and transversely in the other direction with both curvatures ending at the junction with said tail extension, a fish hook secured at one end to said lure body, and means on said tail extension for holding the fish hook against lateral displacement.

3. A fish lure, comprising a lure body of rigid plate material having its greatest lateral enlargement near its rounded front end and tapering to its rear end at which point it is formed with a forked tail extension, said body being curved longitudinally in one direction and transversely in the other direction, with both curvatures ending at the junction with said tail extension, a fish hook secured at one end to said lure body, and means on said tail extension for holding the fish hook against lateral displacement, the same comprising opposed spring jaws on said tail extension between which the shank of the fish hook is yieldingly held.

4. A fish lure, comprising a lure body of rigid plate material having its greatest lateral enlargement near its rounded front end and tapering to its rear end at which point it is formed with a forked tail extension, said body being curved longitudinally in one direction and transversely in the other direction, with both curvatures ending at the junction with said tail extension, a fish hook secured at one end to the underside of said lure body and means on said tail extension for holding the fish hook against lateral displacement.

5. A fish lure, comprising a lure body of rigid plate material having its greatest lateral enlargement near its rounded front end and tapering to its rear end at which point it is formed with a forked tail extension, said body being curved longitudinally in one direction and transversely in the other direction, with both curvatures ending at the junction with said tail extension, a fish hook secured at one end to said lure body, means on said tail extension for holding the fish hook from lateral displacement, a weed guard comprising a pair of wire members connected together at one end by a return bend, with said end having an angular form for engagement in a recess in the lure body, the free ends of said members having lateral relation to the barbed end of the fish hook, and means for fixedly connecting said members to the lure body at a point removed from that of the angular end thereof.

6. A fish lure, comprising a lure body of rigid plate material having its greatest lateral enlargement near its rounded front end and tapering to its rear end at which point it is formed with a forked tail extension, said body being curved longitudinally in one direction and transversely in the other direction, with both curvatures ending at the junction with said tail extension, a fish hook secured at one end to said lure body, means on said tail extension for holding the fish hook from lateral displacement, a weed guard comprising a pair of wire members connected together at one end by a return bend, means for securing said end to the lure body, and means for fixedly connecting said members to the lure body at a point remote from that of said end, the same comprising a strip formed by transverse slits in the lure body, said strip being adapted to straddle said members and having its mid-portion to clasp said members.

In testimony whereof I hereunto affix my signature.

AUGUST F. SCHNELL.